United States Patent [19]
Bergervoet et al.

[11] Patent Number: 5,243,261
[45] Date of Patent: Sep. 7, 1993

[54] MODULATED HIGH FREQUENCY DIMMER CIRCUIT WITH INFRARED SUPPRESSION

[75] Inventors: Jozef R. M. Bergervoet; Leonardus U. E. Konings; Jacob Schlejen; Andrianus M. J. De Bijl; Johannes H. Wessels, all of Eindhoven, Netherlands

[73] Assignee: U.S. Philips Corporation, New York, N.Y.

[21] Appl. No.: 821,510

[22] Filed: Jan. 15, 1992

[30] Foreign Application Priority Data

Feb. 7, 1991 [NL] Netherlands .................. 9100214

[51] Int. Cl.$^5$ .................. H05B 41/29; H05B 41/39
[52] U.S. Cl. .................. 315/248; 315/224; 315/226; 315/307; 315/DIG. 2; 315/DIG. 4; 315/DIG. 5
[58] Field of Search .............. 315/209, 224, 226, 248, 315/344, DIG. 2, DIG. 5, DIG. 7, 307, DIG. 4

[56] References Cited

U.S. PATENT DOCUMENTS

| | | | |
|---|---|---|---|
| 4,219,760 | 8/1980 | Ferro | 315/DIG. 4 X |
| 4,734,624 | 3/1988 | Nagase et al,. | 315/DIG. 7 X |
| 4,766,350 | 8/1988 | Husgen et al. | 315/DIG. 7 X |

Primary Examiner—David Mis

[57] ABSTRACT

A circuit arrangement suitable for operating low-pressure mercury discharge lamp by means of a high-frequency current includes circuitry (I) for generating the high-frequency current from a supply voltage, and a modulator (II) for the substantially square-wave modulation of the amplitude of the high-frequency current at a modulation frequency f. The circuit arrangement is further provided with circuitry (V) for limiting the amplitude of the re-ignition voltage across the low-pressure mercury discharge lamp to a voltage Vi. As a result, interference with infrared systems caused by a discharge lamp operated by the circuit arrangement is substantially fully suppressed.

21 Claims, 3 Drawing Sheets

MODULATED HIGH FREQUENCY DIMMER CIRCUIT WITH INFRARED SUPPRESSION

BACKGROUND OF THE INVENTION

This invention relates to a circuit arrangement suitable for operating a low-pressure mercury discharge lamp by means of a high-frequency current, comprising circuitry for generating the high-frequency current from a supply voltage, and a modulator for the substantially square-wave modulation of the amplitude of the high-frequency current with a modulation frequency f.

Such a circuit arrangement is known from U.S. Pat. No. 4,219,760.

During lamp operation, a substantially square-wave modulated high-frequency voltage is present across the low-pressure mercury discharge lamp, to be referred to hereinafter as the lamp. The frequency and phase of the substantially square-wave modulation of the high-frequency voltage across the lamp are equal to the frequency and phase of the substantially square-wave modulation of the high-frequency current. The lamp is re-ignited by means of the high-frequency voltage, which then acts as the reignition voltage, at the start of every square wave of the substantially square-wave modulated high-frequency voltage. After this, the amplitude of the high-frequency voltage decreases to a substantially constant lamp-dependent value owing to the fact that the lamp becomes conductive, and the high-frequency voltage causes the high-frequency current to flow through the lamp during the square wave. In the remaining portion of each cycle of the substantially square-wave modulation of the high-frequency voltage there is substantially no voltage across the lamp and substantially no current flows through the lamp. The lamp is dimmed in that a duty cycle $\delta$ of the substantially square-wave modulation of the high-frequency voltage is adjusted. It was found that the luminous efficacy is comparatively high and substantially independent of the luminous flux with this dimming method.

When a circuit arrangement according to the prior art is used, the amplitude of the re-ignition voltage assumes a comparatively high value at the beginning of every square wave, so that the lamp is quickly re-ignited. This comparatively high amplitude of the re-ignition voltage, however, adversely affects the life of the circuit arrangement and also causes a momentary light pulse having a high amplitude. Since these light pulses also contain infrared light, they constitute an interference signal for, for example, infrared systems such as infrared remote control systems or audio transfer systems.

SUMMARY OF THE INVENTION

The invention has for its object, inter alia, to provide a circuit arrangement by which the luminous flux of a lamp operated by the circuit arrangement can be adjusted over a wide range and with a comparatively high luminous efficacy, while the degree of interference to infrared systems caused by the lamp is very low.

According to the invention, this object is achieved in that a circuit arrangement of the kind mentioned in the opening paragraph is in addition provided with circuitry for limiting the re-ignition voltage across the lamp to a voltage Vi.

It was found that, in proportion as the re-ignition voltage is limited to a lower value, the amplitude of the light pulse occurring as a result of re-ignition decreases to a greater extent, or even that the light pulse disappears substantially completely. When the amplitude of the light pulse decreases, the interference with infrared systems used in the vicinity of the lamp is also greatly reduced.

A comparatively long duration of a square wave of the substantially square-wave modulation of the high-frequency voltage makes it possible to choose the duration required for lamp re-ignition to be comparatively long in that the amplitude of the re-ignition voltage is limited to a comparatively low value. The duration of a square wave is comparatively long for a given duty cycle $\delta$ in conjunction with a comparatively low modulation frequency f, so that it is desirable for limiting the interference with infrared systems to choose the modulation frequency f to be comparatively low. A practical lower limit of the modulation frequency f is set, however, by the fact that the light radiated by a lamp operated with a modulation frequency below approximately 100 Hz is preceived to be unpleasant by the human eye. In addition, in case the modulation frequency is relatively low and the duty cycle $\delta$ is relatively small, the current through the lamp is practically zero for a relatively long time interval in each period of the modulation. Because of the fact that the current through the lamp is practically zero for a relatively long time interval, relatively many charged particles in the plasma of the lamp recombine, causing the re-ignition of the lamp to be relatively difficult, in the case where the modulation frequency is relatively low and the duty cycle $\delta$ is relatively small. In practice it was found that in most cases, even when the duty cycle $\delta$ was relatively small, it was possible to limit the re-ignition voltage in such a way that an effective suppression of the interference of infrared systems was realized, in case the modulation frequency was chosen in the range from 100 Hz to 10 kHz.

It was found in practice that for every lamp temperature a suitable limitation of the re-ignition voltage is to be chosen between very narrow limits and that the suitable limitation of the re-ignition voltage is temperature-dependent. A suitable limitation of the re-ignition voltage is understood to mean here a voltage Vi at which the lamp can be ignited sufficiently quickly, while at the same time the interference with infrared systems caused by the lamp is small. A small rise in the voltage Vi relative to the suitable value leads to a strong increase in the interference to infrared systems, while a small reduction of the voltage Vi relative to the suitable value means that the time required for re-igniting the lamp increases strongly, or even that the lamp fails to re-ignite within the time duration of a square wave.

As a result of the observed temperature dependence of the suitable limitation of the re-ignition voltage, this suitable limitation must be continually adapted as the lamp temperature increases to a stationary operating temperature after starting. It was found that this problem can be solved by making the voltage Vi, to which the re-ignition voltage is limited, dependent upon time. It was found that, for example, a gradual increase in the value of the voltage Vi at the beginning of every square wave of the substantially square-wave modulated high-frequency voltage results in the lamp being re-ignited at different temperatures (and accompanying different maximum values of the amplitude of the re-ignition voltage) substantially without causing interference to infrared systems.

As a result of lamp-ignition, the amplitude of the high-frequency voltage across the lamp is higher during a time interval $\Delta t1$ of every square wave than during the portion of the square wave in which the lamp has been re-ignited and the amplitude of the high-frequency voltage is substantially constant. This time interval $\Delta t1$ can be electronically measured in a simple manner and is a measure of the time duration of re-ignition. Since the time duration of the re-ignition and the interference with infrared systems caused by this re-ignition are related to one another, it is possible to render lamp re-ignition further controllable in that the time interval $\Delta t1$ is controlled via the voltage Vi. The time interval $\Delta t1$ must then be controlled to such a value that the lamp is re-ignited at the accompanying voltage Vi sufficiently quickly and at the same time causes only a small degree of interference with infrared systems. It is possible to control, instead of the time interval $\Delta t1$, a different time interval which is a measure of the time duration of lamp re-ignition, such as, for example, the time interval between the start of a square wave of the substantially square-wave modulated high-frequency voltage and the moment during the square wave at which the lamp is reignited and at which the amplitude of the high-frequency voltage has become substantially constant.

Interference with infrared systems may be caused not only by light pulses occurring as a result of an insufficient control of lamp re-ignition at the beginning of every square wave of the substantially square-wave modulated high-frequency voltage, but also by too quick a decrease in luminous flux at the end of every square wave. It was found that, if the amplitude of the high-frequency current through the lamp is gradually reduced to substantially the value zero during a time interval which forms a substantial portion of a cycle belonging to the frequency f, the luminous flux also decreases gradually to substantially the value zero during this time interval. This gradual drop in the luminous flux at the end of every square wave results in a further suppression of the interference with infrared systems. This further suppression increases in proportion as the time interval during which the amplitude of the high-frequency current through the lamp is gradually reduced to substantially the value zero increases.

BRIEF DESCRIPTION OF THE DRAWINGS

Embodiments of the invention will now be explained in more detail with reference to the accompanying drawing.

In the drawing.

DESCRIPTION OF THE PREFERRED EMBODIMENTS

Figure 1:
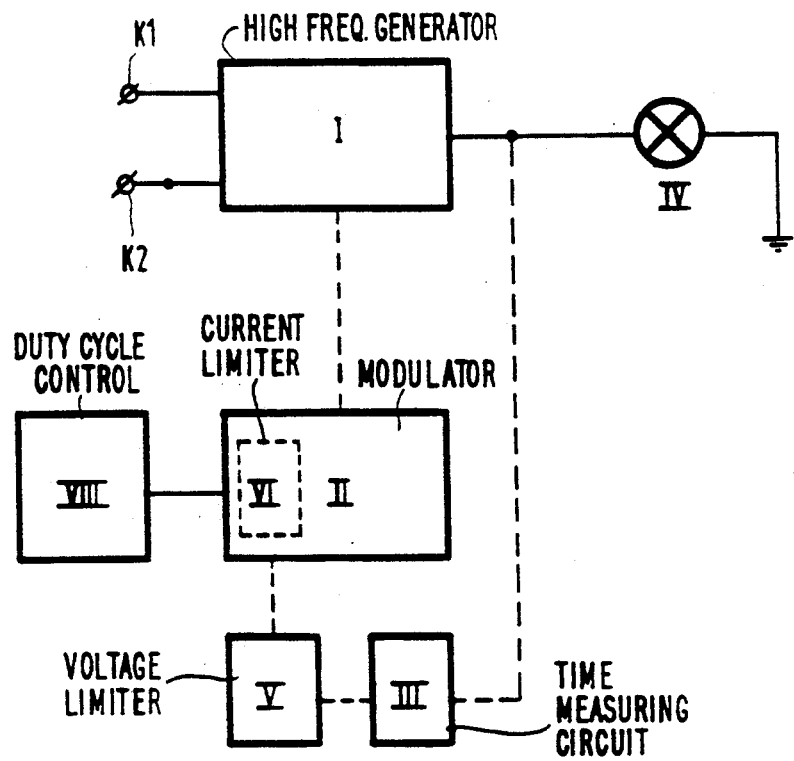
FIG. 1 is a diagrammatic representation of the construction of an embodiment of a circuit arrangement according to the invention.

In FIG. 1, K1 and K2 are input terminals suitable for connection to a supply voltage source. I designates circuitry for generating a high-frequency current from a supply voltage delivered by the supply voltage source. II is a modulator for the substantially square-wave modulation of the amplitude of the high-frequency current with a modulation frequency f. Modulator II is also provided with circuitry VI for reducing the amplitude of the high-frequency current at the end of every square wave from a substantially constant value during normal stable lamp operation down to substantially the value zero during a time interval which is a substantial portion of a cycle corresponding to the modulation frequency f. An output of circuit I is coupled to a lamp IV. The output of circuit I is also connected to an input of circuit section III for measuring a time interval $\Delta t1$ during which the amplitude of a substantially square-wave modulated high-frequency voltage across the lamp is higher than a substantially constant value during stationary lamp operation. An output of circuit section III is connected to an input of circuit V for limiting the amplitude of a re-ignition voltage across the lamp to a voltage Vi. An output of circuit V is connected to an input of modulator II. A further input of modulator II is connected to an output of circuitry VIII for adjusting a duty cycle $\delta$ of the substantially square-wave modulated high-frequency voltage across the lamp.

The operation of the circuit arrangement shown in FIG. 1 is as follows.

When the input terminals K1 and K2 are connected to a supply voltage source, the circuitry I generates a high-frequency current which is modulated substantially into a square-wave shape by the modulator II with a modulation frequency f. A high-frequency voltage is present across the lamp, also substantially square-wave modulated with modulation frequency f. The amplitude of the substantially square-wave modulated high-frequency voltage is higher than the substantially constant value during stationary lamp operation during a time interval $\Delta t1$ because of lamp re-ignition at the start of every square wave. After re-ignition, the high-frequency voltage causes the high-frequency current to flow through the lamp. The time interval $\Delta t1$ is measured by circuit section III and is a measure of the duration of the re-ignition of the lamp. The circuit V adjusts the voltage Vi in dependence on the result of this measurement. The voltage Vi is increased in the case of an increase in $\Delta t1$, the voltage Vi is decreased in the case of a decrease of $\Delta t1$. It is achieved in this way that the lamp is re-ignited sufficiently quickly at the start of every square wave of the substantially square-wave modulated high-frequency voltage, while this re-ignition does not cause a momentary light pulse of high amplitude, so that the interference with infrared systems caused by the lamp is only slight.

A further reduction in infrared system interference is achieved by the circuit VI in that this circuitry causes the amplitude of the high-frequency current through the lamp, and thus the luminous flux at the end of every square wave, to decrease gradually.

The luminous flux of the lamp is adjustable through adjustment of the duty cyle $\delta$ of the substantially square-wave modulated high-frequency voltage by means of circuit VIII.

Figure 2:
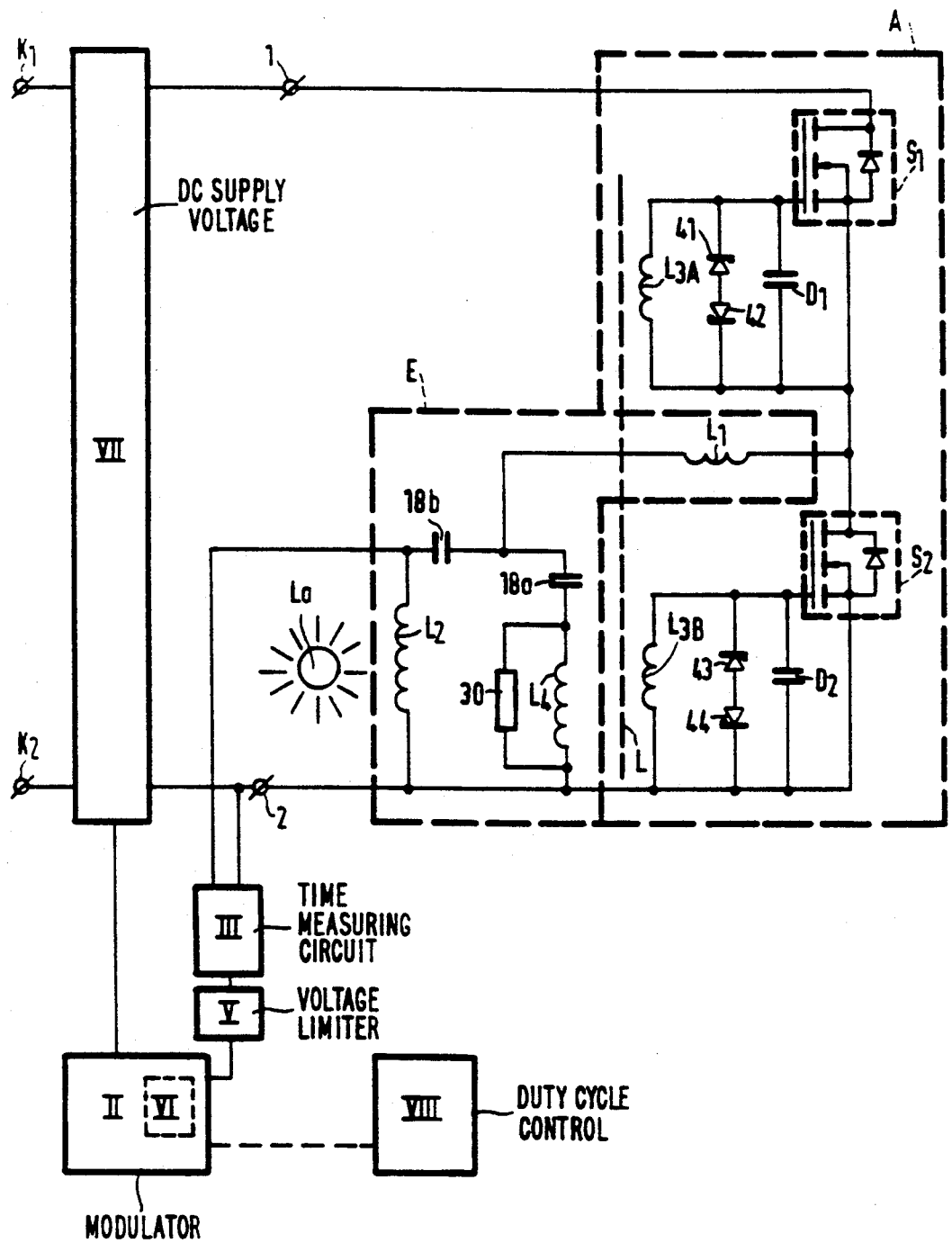
FIG. 2 shows the embodiment of FIG. 1 in greater detail.

In the circuit arrangement shown in FIG. 2, circuit sections A and E together with input terminals 1 and 2 form an incomplete half bridge. K1 and K2 are input terminals suitable for connection to a supply voltage source, and VII is circuitry for generating a DC voltage from a supply voltage. In conjunction with the circuit VII and the input terminals K1 and K2, the incomplete half bridge forms a circuit for generating a high-frequency current from a supply voltage. La is an electrodeless lamp operated by means of this circuit. Modulator II is coupled to input terminals 1 and 2 of the incomplete half bridge. The incomplete half bridge is built up as follows.

Branch A is formed by switching elements S1 and S2, secondary windings L3A and L3B of transformer L, zener diodes 41, 42, 43, 44, and capacitors D1 and D2. Load branch E consists of coil L1 and the load circuit formed by coil L2, primary winding L4 of transformer L, capacitors 18a and 18b, and resistor 30.

Switching elements S1 and S2 each comprise a freewheel diode of which an anode is connected to a first main electrode of the relevant switching element and a cathode is connected to a second main electrode of the relevant switching element.

Coil L2 is positioned inside a cavity of a lamp vessel of an electrodeless lamp La.

The second main electrode of the switching element S1 is connected to input terminal 1. An end of the secondary winding L3A is connected to a control electrode of the switching element S1 and a further end of the secondary winding L3A is connected to the first main electrode of the switching element S1. The capacitor D1 shunts the secondary winding L3A. The secondary winding L3A is also shunted by a series circuit of two zener diodes 41 and 42, whose anodes are interconnected. The first main electrode of the switching element S1 is connected to the second main electrode of the switching element S2. An end of the secondary winding L3B is connected to a control electrode of the switching element S2 and a further end of secondary winding L3B is connected to the first main electrode of the switching element S2. The capacitor D2 shunts the secondary winding L3B. The secondary winding L3B is also shunted by a series circuit of two zener diodes 43 and 44, whose anodes are interconnected. The first main electrode of switching element S2 is connected to input terminal 2.

One side of coil L1 is connected to a junction point of switching elements S1 and S2. A further end of coil L1 is connected to one side of capacitor 18a and one side of capacitor 18b. A further side of capacitor 18b is connected to an end of coil L2. A further end of coil L2 is connected to input terminal 2. A further end of capacitor 18a is connected to primary winding L4. A further end of primary winding L4 is connected to input terminal 2. Resistor 30 shunts primary winding L4.

The operation of the circuit shown in FIG. 2 is as follows.

When the input terminals K1 and K2 are connected to the poles of a supply voltage source, a substantially square-wave voltage Vin with a duty cycle $\delta$ and a frequency f is present between the input terminals 1 and 2. The voltage Vin is substantially equal to zero during a portion of the cycle belonging to the frequency f. During this portion of each cycle, the voltage across the lamp La is also substantially zero. During the remaining portion of each cycle of Vin, the potential of input terminal 1 is higher than that of input terminal 2, and the switching elements S1 and S2 of the incomplete half bridge are made conducting and non-conducting at a high frequency $v$. As a result, a high-frequency voltage with frequency $\Delta$ is present across the lamp La. This means that a voltage is present across the lamp La which is substantially square-wave modulated and of high frequency, the phase and the frequency of the substantially square-wave modulation corresponding to that of the substantially square-wave voltage Vin. The high-frequency voltage across the lamp as the re-ignition voltage at the start of each square wave of the substantially square-wave modulation. The circuitry V limits the amplitude of the voltage Vin at the start of every square wave of Vin. Since the amplitude of the re-ignition voltage is dependent on the amplitude of the voltage Vin, this limitation of the amplitude of Vin results in a limitation of the amplitude of the re-ignition voltage to a voltage Vi. After the moment $t_m$ in each square wave at which the amplitude of the re-ignition voltage reaches a maximum value, the amplitude of Vin decreases to the substantially constant value corresponding to stationary lamp operation. Thanks to the limitation of the amplitude of the re-ignition voltage, the lamp La is re-ignited at the start of each square-wave of the substantially square-wave modulation practically without causing interference to infrared systems. After re-ignition, a high-frequency current flows through the lamp during the remaining portion of each square wave.

Circuit VI causes the amplitude of Vin to decrease gradually to substantially the value zero at the end of each square wave of Vin during a time interval which is a substantial portion of a cycle of the voltage Vin. As a result, the amplitude of the high-frequency voltage across the lamp, and thus also the amplitude of the high-frequency current through the lamp, gradually decreases to substantially zero over a time interval which is a substantial portion of a cycle of the substantially square-wave modulation. This gradual decrease of the high-frequency current through the lamp at the end of each square wave of the substantially square-wave modulation results in a further suppression of the interference to infrared systems.

Circuit section III measures the time interval $\Delta t1$ during which the amplitude of the high-frequency voltage across the lamp is greater than the substantially constant value at a stationary lamp operation. Depending on the result of this measurement, the limitation of the amplitude of the voltage Vin at the start of each square wave of Vin is adjusted by circuit V. The adjustment of the limitation of the amplitude of the voltage Vin corresponds to an adjustment of the voltage Vi to which amplitude of the reignition voltage across the lamp is limited. The time interval $\Delta t1$ is controlled at a substantially constant value by circuit section III and circuitry V, so that the suppression of infrared system interference is substantially independent of lamp temperature.

If the supply voltage is an AC voltage, circuit VII may be composed of, for example, a diode bridge and a combination of one or several DC-DC converters of types such as up, down, or flyback converters. Through variation of the duty cycle of the switch(es) present in the DC-DC converter(s) periodically with a frequency f, it is possible to cause Vin to be of a substantially square-wave shape with a frequency f and to limit the amplitude of Vin.

Figure 3:
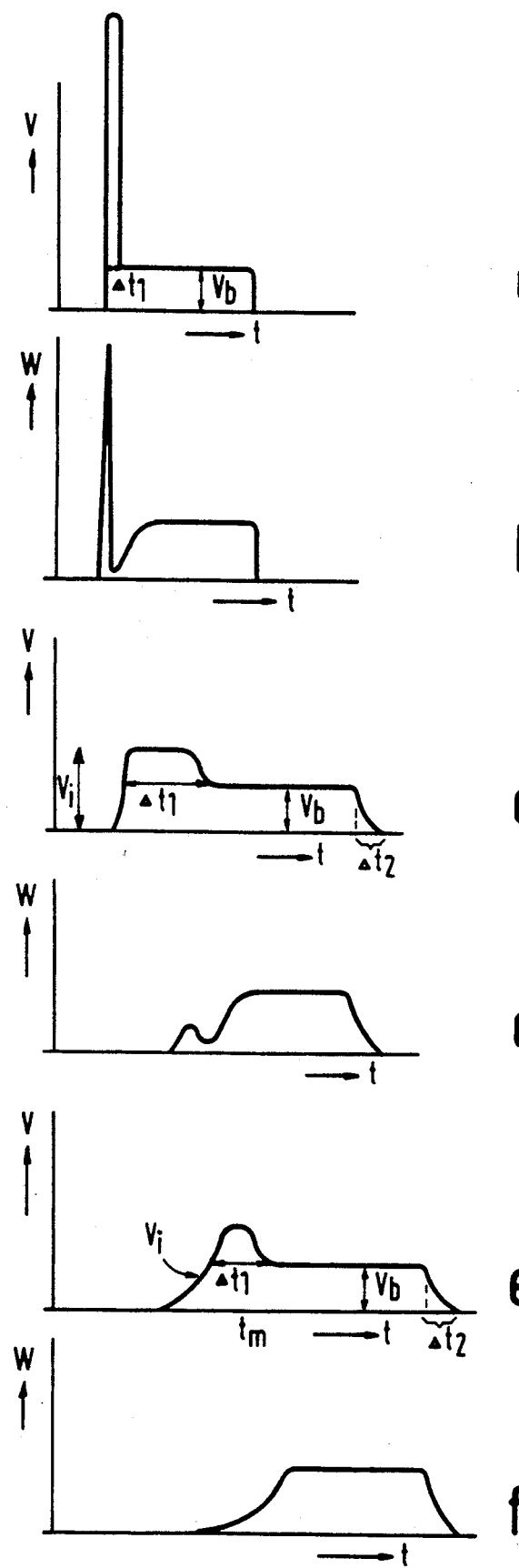
FIG. 3 shows three different shapes of an amplitude, expressed in volts, of a substantially square-wave modulated high-frequency voltage across a low-pressure mercury lamp as a function of time, and three accompanying shapes of the luminous flux, expressed in watts, of the low-pressure mercury lamp as a function of time.

FIG. 3a shows an amplitude graph of the high-frequency voltage across a lamp operated by means of a circuit according to the prior art, during a square wave of the substantially square-wave modulation, in a situation in which no measures were taken to control the re-ignition process. At the start of a square wave of the substantially square-wave modulated high-frequency voltage, the amplitude of the high-frequency voltage is comparatively high during a time interval $\Delta t1$ as a result of lamp re-ignition. After re-ignition the amplitude of the high-frequency voltage assumes a considerably lower value Vb during the remaining portion of the square wave. The amplitude of the high-frequency voltage drops very quickly to substantially the value zero at the end of every square wave.

Both the radiant flux of the infrared radiation and the luminous flux of the visible light show the time-dependent behaviour represented in FIG. 3b. As a result of the comparatively high amplitude of the ignition voltage, a momentary light pulse of comparatively high amplitude will occur. Then the luminous flux stabilizes at a substantially constant value. The luminous flux is maintained at this substantially constant value during a portion of the square wave. At the end of the square wave the luminous flux drops very quickly to substantially the value zero. The momentary light pulse and (to a lesser degree) the quick drop in luminous flux down to substantially the value zero at the end of each square wave both cause interference with infrared systems.

FIG. 3c shows the change in amplitude of the high-frequency voltage across the lamp during a square wave of the substantially square-wave modulation in the case in which the amplitude of the re-ignition voltage is limited to a substantially constant voltage Vi and measures are also taken to have the amplitude of the high-frequency voltage across the lamp decrease gradually at the end of each square wave. After re-ignition, the amplitude of the high-frequency voltage drops to a value Vb, just as in the case shown in FIG. 3a. Since the amplitude of the re-ignition voltage is lower, the time required for lamp re-ignition is greater than if no measures were taken to control the re-ignition process. This is apparent in that the time interval $\Delta t1$ during which the amplitude of the high-freqency voltage across the lamp is higher than the value Vb has been further increased. At the end of the square wave, the amplitude of the high-frequency voltage across the lamp, and thus the amplitude of the high-frequency current through the lamp, decreases during the time interval $\Delta t2$ from the value Vb during stationary lamp operation to substantially the value zero, $\Delta t2$ being a substantial portion of a cycle belonging to the frequency f.

FIG. 3d shows the luminous flux as a function of time in the case in which the amplitude of the high-frequency voltage across the lamp as a function of time varies as indicated in FIG. 3c. It can be seen that the amplitude of the momentary light pulse has considerably decreased and also that the decrease in luminous flux at the end of the square wave down to the value zero takes place over a greater time interval than in the lamp operation shown in FIG. 3b. These two changes result in a considerable decrease in the interference with infrared systems caused by light radiated by the lamp.

FIG. 3e shows the shape of the amplitude of the high-frequency voltage across the lamp when the voltage Vi to which the amplitude is limited is time-dependent. In the case shown, the voltage Vi increases gradually at the beginning of each square wave. The amplitude of the high-frequency voltage across the lamp increases to a maximum value. After this maximum value, the amplitude decreases to the value Vb. The shape of the amplitude as a function of time is substantially identical to the shape shown in FIG. 3c from the moment at which the amplitude has reached the value Vb. The time duration $\Delta t1$ can be controlled in that the voltage Vi is caused to increase more or less quickly before the moment $t_m$ at which the amplitude of the high-frequency voltage across the lamp is at its maximum. $\Delta t1$ has thus been made substantially time-independent.

FIG. 3f shows the luminous flux of the lamp as a function of time in the case in which the amplitude of the high-frequency voltage across the lamp as a function of time varies as shown in FIG. 3e. It can be seen that the momentary light pulse is substantially not present anymore and the luminous flux increases gradually from substantially the value zero to the same substantially constant level as that reached in FIG. 2b and FIG. 2d. The decrease in luminous flux from the substantially constant level down to substantially the value zero also takes place very gradually, as is the case in FIG. 2d. The gradual changes in luminous flux both at the beginning and at the end of each square wave have the result that the interference with infrared systems caused by the lamp is very slight.

Figure 4:
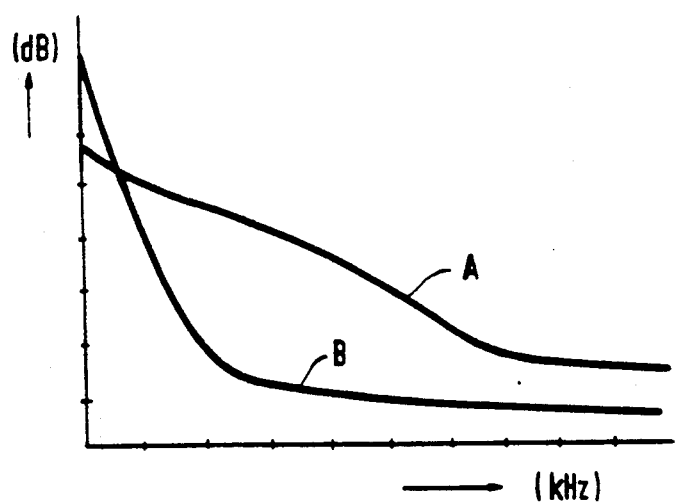
FIG. 4 shows frequency spectra of the power of an infrared signal radiated by an electrodeless low-pressure mercury lamp.

In FIG. 4, the power of the infrared light radiated by a lamp expressed in decibels (dB) is plotted along the y-axis. Each segment of the y-axis corresponds to a power change of 10 dB. The quantity plotted on the x-axis is the frequency, each segment of the x-axis corresponding to a frequency change of 10 kilohertz (kHz). The origin of the coordinate system shown is the point (x=0 kHz, y=0 dB). The lamp used was an electrodeless low-pressure mercury discharge lamp with a power rating of 100 watts. The lamp was operated by means of a substantially square-wave modulated high-frequency current. The Figure shows the frequency spectrum of the power of the infrared light radiated by the lamp, both for the case in which measures were taken to control the change of the amplitude of a high-frequency voltage across the electrodeless low-pressure mercury lamp and to control the decrease of the amplitude of the high-frequency current at the end of each square wave, and for the case in which such measures were not taken. The frequency $\Delta$ of the high-frequency current was approximately 2.65 MHz and the modulation frequency f of the substantially square-wave modulation was approximately 200 Hz. Where no measures were taken to control lamp re-ignition, the amplitude of the re-ignition voltage across the lamp increased to above 1000 volts and the frequency spectrum of the infrared light radiated by the lamp yielded curve A. Curve B was measured for the same lamp after measures had been taken to limit the re-ignition voltage to a time-dependent voltage Vi of which the amplitude rose from substantially zero volts to a maximum value of approximately 220 volts in approximately 200 $\mu$seconds, and to increase the amplitude of the high-frequency voltage across the lamp gradually at the end of each square wave over a time interval of approximately 200 $\mu$seconds, as shown in FIG. 3e. Both curve A and curve B were measured at a bandwidth of 3 kHz. It can be deduced from the position of curve B relative to curve A that the intensity of the infrared signal, when the amplitude of the high-frequency voltage across the lamp is controlled, is considerably lower over a comparatively wide frequency range than it is in the case of the non-controlled amplitude of the high-frequency voltage across the lamp. Many remote control devices operating with infrared light operate at a frequency of a few tens of kHz. It is evident from FIG. 4 that the measures according to the invention effect a suppression of the infrared light radiated by the lamp in this frequency range of often more than 20 dB.

We claim:

1. A circuit arrangement suitable for operating a low-pressure mercury discharge lamp by means of a high-frequency current, comprising;
    circuitry for generating the high-frequency current from a supply voltage,
    a modulator for the substantial square-wave modulation of the amplitude of the high-frequency current with a modulation frequency f, and circuitry for limiting the re-ignition voltage produced across the lamp to a voltage Vi.

2. A circuit arrangement as claimed in claim 1, wherein the modulation frequency is between 100 Hz and 10 kHz.

3. A circuit arrangement as claimed in claim 1, which further comprises circuitry for rendering the voltage Vi time-dependent.

4. A circuit arrangement as claimed in claim 1, further comprising circuitry for rendering the voltage Vi dependent on the time duration of the re-ignition of the low-pressure mercury discharge lamp.

5. A circuit arrangement as claimed in claim 1, further comprising circuitry for reducing the amplitude of the high-frequency current from its value during stable lamp operation to substantially the value zero during a time interval which is a substantial portion of a cycle of the frequency f.

6. A circuit arrangement as claimed in claim 2 which further comprises circuitry for rendering the voltage Vi time-dependent.

7. A circuit arrangement as claimed in claim 2 further comprising circuitry for rendering the voltage Vi dependent on the time duration of the re-ignition of the low-pressure mercury discharge lamp.

8. A circuit arrangement as claimed in claim 3 further comprising circuitry for rendering the voltage Vi dependent on the time duration of the re-ignition of the low-pressure mercury discharge lamp.

9. A circuit arrangement as claimed in claim 2 further comprising circuitry for reducing the amplitude of the high-frequency current from its value during stationary lamp operation to substantially the value zero during a time interval which is a substantial portion of a cycle corresponding to the frequency f, and wherein the voltage Vi is limited to a voltage level at which a significant part of any infrared radiation produced by the lamp will be suppressed.

10. A circuit arrangement as claimed in claim 3, further comprising circuitry for reducing the amplitude of the high-frequency current from its value during stable lamp operation to substantially the value zero during a time interval which is a substantial portion of a cycle of the frequency f.

11. A circuit arrangement as claimed in claim 4, further comprising circuitry for reducing the amplitude of the high-frequency current from its value during stable lamp operation to substantially the value zero during a time interval which is a substantial portion of a cycle of the frequency f.

12. An electric circuit for operating an electric discharge lamp with reduced infrared radiation comprising:
    a pair of input terminals for connection to a source of supply voltage for the circuit,
    a high-frequency current generator coupled to said pair of input terminals,
    a modulator coupled to said high-frequency current generator for square wave modulating the high-frequency current generated at a modulation frequency f, and
    means coupled to the square wave modulator for limiting the level of the voltage applied to the discharge lamp during a time interval $\Delta t1$ at the start of a square wave to a voltage Vi sufficient to reignite the discharge lamp while suppressing a substantial portion of any infrared radiation produced by the discharge lamp during said time interval.

13. An electric circuit as claimed in claim 12 wherein the modulation frequency f is much lower than said high-frequency.

14. An electric circuit as claimed in claim 13 wherein the modulator causes the high-frequency current generator to supply high-frequency current pulses to the discharge lamp for a first time period and interrupts the supply of the high-frequency current pulses for a second time period, said first and second time periods together forming the modulation time period, and
    means coupled to the modulator for adjusting the duty cycle $\delta$ of the lamp current thereby to variably dim the discharge lamp.

15. An electric circuit as claimed in claim 12 wherein said voltage limiting means limits the amplitude of the high frequency output voltage of the high-frequency generator thereby to limit the voltage Vi.

16. An electric circuit as claimed in claim 12 further comprising means for measuring the time interval $\Delta t1$ and having an output coupled to a control input of the voltage limiting means whereby the voltage limiting means adjusts the voltage Vi via the modulator as a function of the measured time interval $\Delta t1$.

17. An electric circuit as claimed in claim 12 wherein in order to limit the voltage Vi and to at the same time ensure reliable lamp reignition at the start of every square wave, the time interval $\Delta t1$ is extended in comparison to a circuit which does not limit the voltage Vi.

18. An electric circuit as claimed in claim 12 further comprising means for making the voltage Vi time dependent.

19. An electric circuit as claimed in claim 12 further comprising means for making the voltage Vi dependent on the time interval $\Delta t1$.

20. An electric circuit as claimed in claim 12 further comprising means for gradually reducing the amplitude of the high-frequency current at the end of a square wave from its amplitude during stable lamp operation to zero over an extended time interval sufficient to reduce infrared radiation otherwise produced by the lamp at the end of a square wave of modulated current.

21. An electric circuit as claimed in claim 12 wherein said electric circuit comprises at least one switching transistor which is a part of the lamp energizing circuit and said energizing circuit is non-resonant.

* * * * *